UNITED STATES PATENT OFFICE.

THOMAS SANDLANT, OF MASTERTON, NEW ZEALAND.

COMPOSITION FOR FINISHING AND DRESSING LEATHER AND PROCESS OF MAKING SAME.

1,234,494.     Specification of Letters Patent.     Patented July 24, 1917.

No Drawing.     Application filed December 10, 1915. Serial No. 66,061.

*To all whom it may concern:*

Be it known that I, THOMAS SANDLANT, a citizen of the Dominion of New Zealand, and residing at 4 Hope street, Masterton, in the Provincial District of Wellington, in the Dominion of New Zealand, have invented certain new and useful Improvements in Compositions for Finishing and Dressing Leather and Process of Making Same, of which the following is a specification.

This invention relates to compositions of matter used for finishing or giving a final dressing to leather, cloths and the like, employed more particularly in upholstering carriages, motor cars, furniture and the like.

My composition contains no injurious chemical substance such as acid, caustics or the like, but is composed of mineral oils and vegetable and mineral gums, which by my mode of making produce a solution having great affinity for leather or leather cloth surfaces, and when mixed with mineral pigments forms a composition, which gives a finish equal in wear and pliability to the dressing the leather or leather cloth originally had, and does not oxidize as ordinary dressing compositions do.

The ingredients employed in the manufacture of my composition are varnish, methylated spirit, linseed oil, benzin, petroleum and a coloring matter, in the following proportions by measure:—

| | |
|---|---|
| Hard drying elastic varnish | 30 ounces |
| Methylated spirit or alcohol | 30 ounces |
| Boiled linseed oil (strong drying oil) | 10 ounces |
| Benzin, benzol or naphtha | 60 ounces |
| Petroleum or kerosene | 30 ounces |

The varnish, methylated spirit, and linseed oil are first mixed together and digested at a temperature of ninety degrees Fahrenheit for one hour or more. It should be stated that substantially any so-called hard drying "elastic varnish" can be used, and as an example ordinary coach body varnish made in the ordinary way from copal gum, linseed oil and spirits of turpentine, may be mentioned.

The benzin and petroleum are added to the mixture of varnish, methylated spirit and linseed oil, while the said mixture is still hot. The whole of the ingredients so mixed together are well stirred.

Coloring matter is added to the composition as above formed, the proportion being ten per cent. of coloring matter, or a larger proportion according to the pigment to be used.

The proportions of the ingredients are varied according as a dull, medium or glossy finish is desired to be imparted to the surface to be treated with the composition.

The composition is used for dressing or finishing new leather, or for renovating leather that has become worn or injured by exposure to the weather or otherwise.

What I do claim and desire to secure by Letters Patent of the United States is:—

1. A new composition of matter comprising hard drying elastic varnish 3 parts, alcohol 3 parts, boiled linseed oil 1 part, naphtha 6 parts, petroleum oil 3 parts and pigment.

2. A method of making a pliable non-oxidizing dressing composition for leather comprising digesting by means of heat, a hard drying elastic varnish mixed with boiled linseed oil and alcohol and thereafter incorporating naphtha and a petroleum oil while the digested mixture is in a hot condition.

In testimony whereof I have signed my name to this specification in the presence of two witnesses.

THOMAS SANDLANT.

Witnesses:
ERNEST SMITH BALDWIN,
JAMES ANDERSON HARDIE.